(12) United States Patent
Brown

(10) Patent No.: US 11,612,467 B1
(45) Date of Patent: Mar. 28, 2023

(54) ALTERNATE ELIMINATOR TOOTH

(76) Inventor: Alphonso William Brown, Baltimore, MD (US)

( * ) Notice: Subject to any disclaimer, the term of this patent is extended or adjusted under 35 U.S.C. 154(b) by 129 days.

(21) Appl. No.: 13/573,159

(22) Filed: Aug. 28, 2012

(51) Int. Cl.
*A61C 17/22* (2006.01)

(52) U.S. Cl.
CPC ................... *A61C 17/222* (2013.01)

(58) Field of Classification Search
CPC ... A47L 11/4038; A47L 11/164; B24D 13/20; B24D 13/147; B24D 9/08; A61C 17/222; A61C 17/225; A61C 17/24; A61C 17/26; A61C 17/32; A61C 17/34; A61C 17/3409; A61C 17/3445; A61C 17/3472
USPC ............................................. 15/23, 24, 230
See application file for complete search history.

(56) References Cited

U.S. PATENT DOCUMENTS

| | | | | |
|---|---|---|---|---|
| 2,655,675 A | * | 10/1953 | Grover | A61C 17/26 15/23 |
| 4,535,642 A | * | 8/1985 | Ohmura | F16H 25/122 74/569 |
| 4,827,550 A | * | 5/1989 | Graham | A61C 17/34 403/326 |
| 5,044,035 A | * | 9/1991 | Barradas | 15/23 |
| 5,864,911 A | * | 2/1999 | Arnoux et al. | 15/23 |
| 6,381,794 B1 | * | 5/2002 | Porper | A46B 9/045 15/22.1 |
| 7,356,866 B2 | * | 4/2008 | Chan | A61C 17/222 15/28 |
| 7,921,496 B2 | * | 4/2011 | Choi | A46B 9/04 15/22.1 |
| 2004/0168270 A1 | * | 9/2004 | Choi | A46B 9/04 15/23 |
| 2006/0021166 A1 | * | 2/2006 | Hills | 15/23 |
| 2011/0289702 A1 | * | 12/2011 | Lee | A61C 17/26 15/22.1 |

* cited by examiner

Primary Examiner — Robert J Scruggs

(57) ABSTRACT

The Alternate Eliminator Tooth Brush uses a very different unique method in which to clean teeth. This unique operation is achieved with a new tooth brush design that has two revolving tooth brush heads, one directly behind the other on two separate axels as each revolves in opposite directions giving a more effective method producing a more thorough scouring of the teeth, tongue, and gums with a double whisking cleaning action along with the reciprocation of the front tooth brush head helping to remove mucus that causes plaque build up. The steady vigorous whisking action of dual heads provides a constant action over the entire surface of the teeth while preventing the redistribution of food particles in and between the teeth. A common occurrence with the conventional hand held, and the electric tooth brushes, but something thats avoided with the three speed motor of the Alternate Eliminator Tooth Brush.

1 Claim, 15 Drawing Sheets

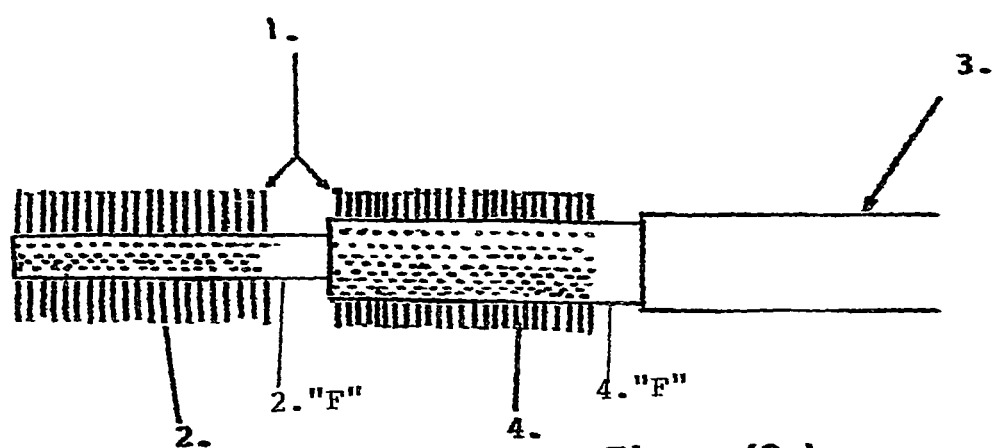
Figure (1.)
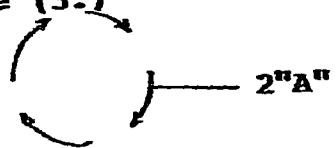
Figure (3.)
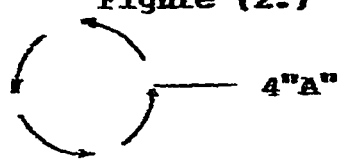
Figure (2.)
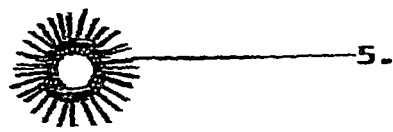
Figure (4.)

Figure (5.)
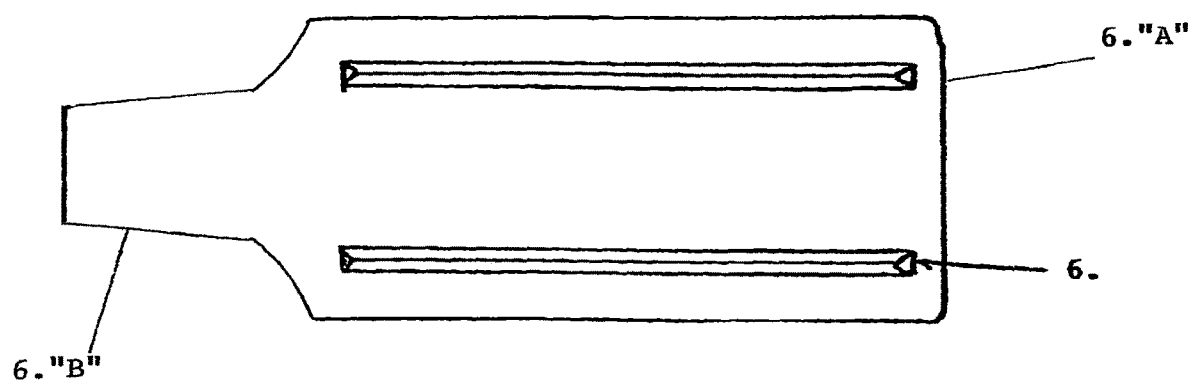
Figure (6.)
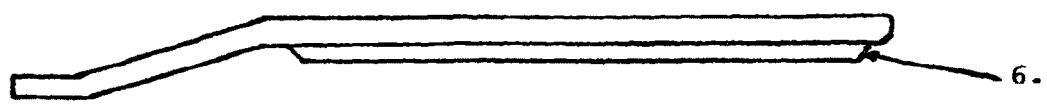
Figure (7.)
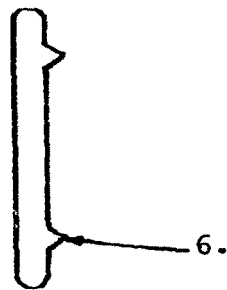

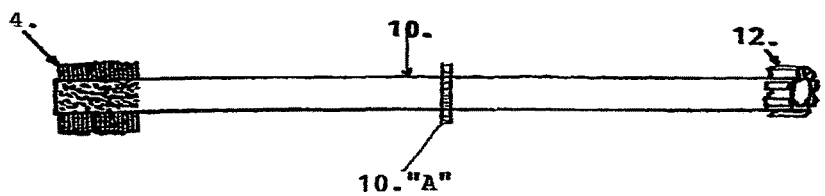
Figure (8.)
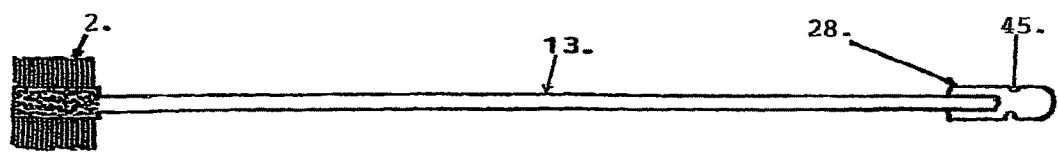
Figure (9.)
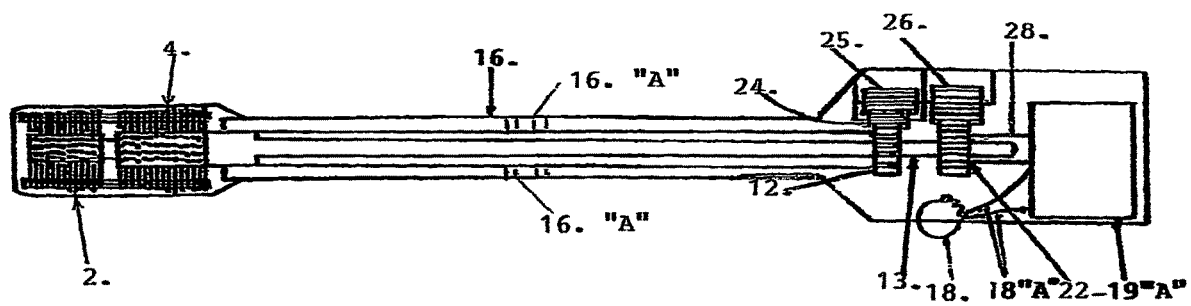
Figure (10.)
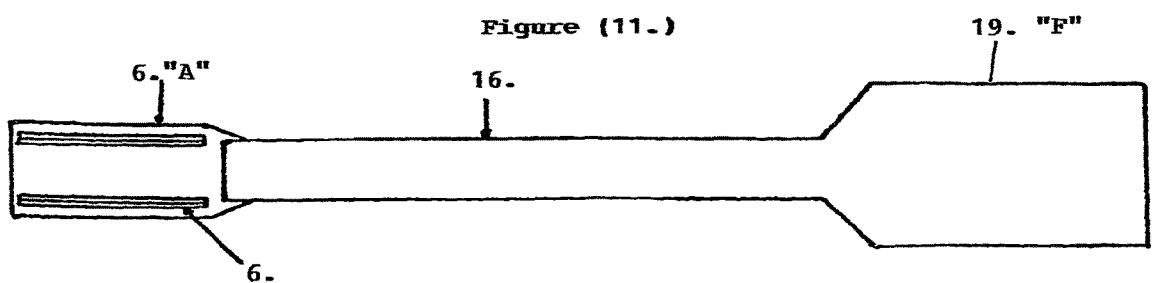
Figure (11.)

Figure (12.)
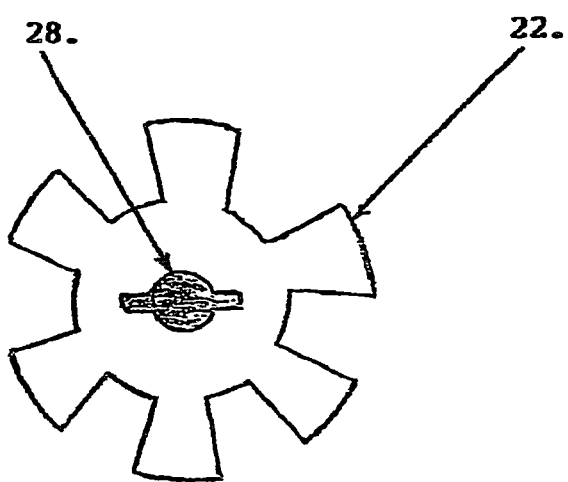

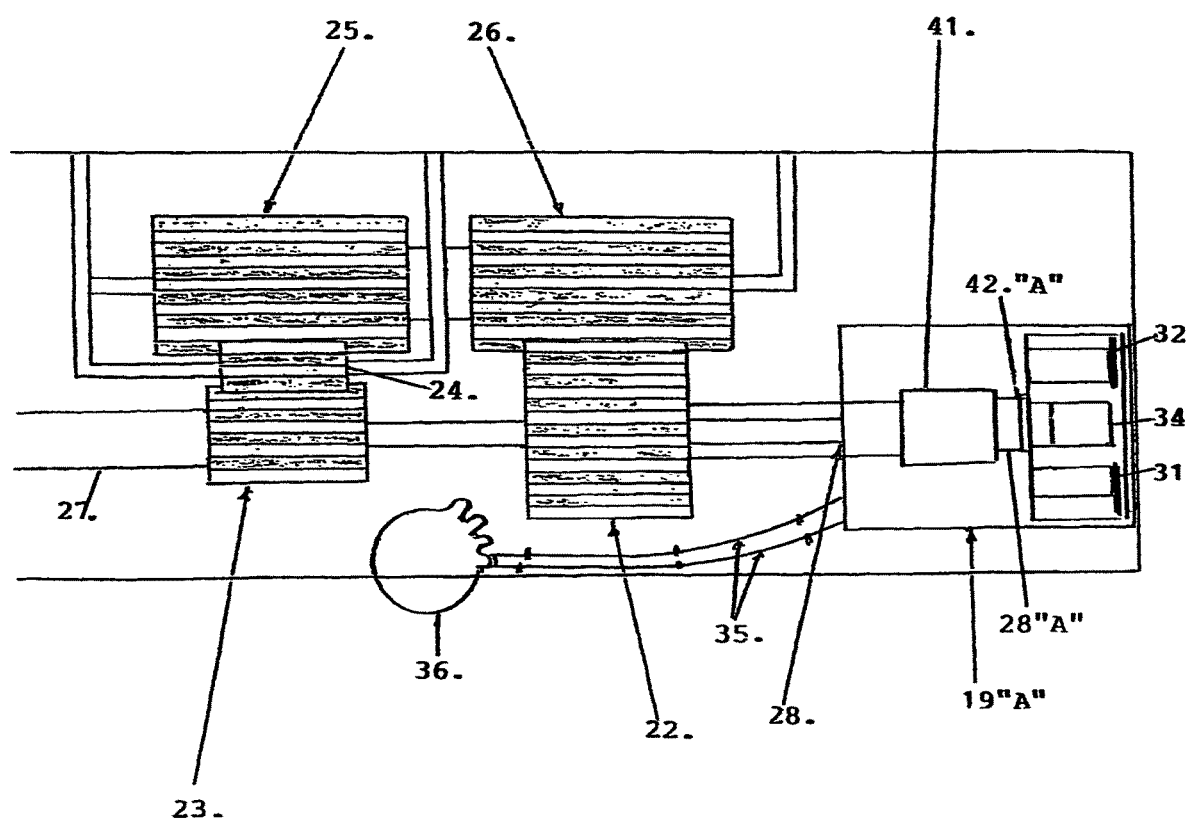
Figure (13.)

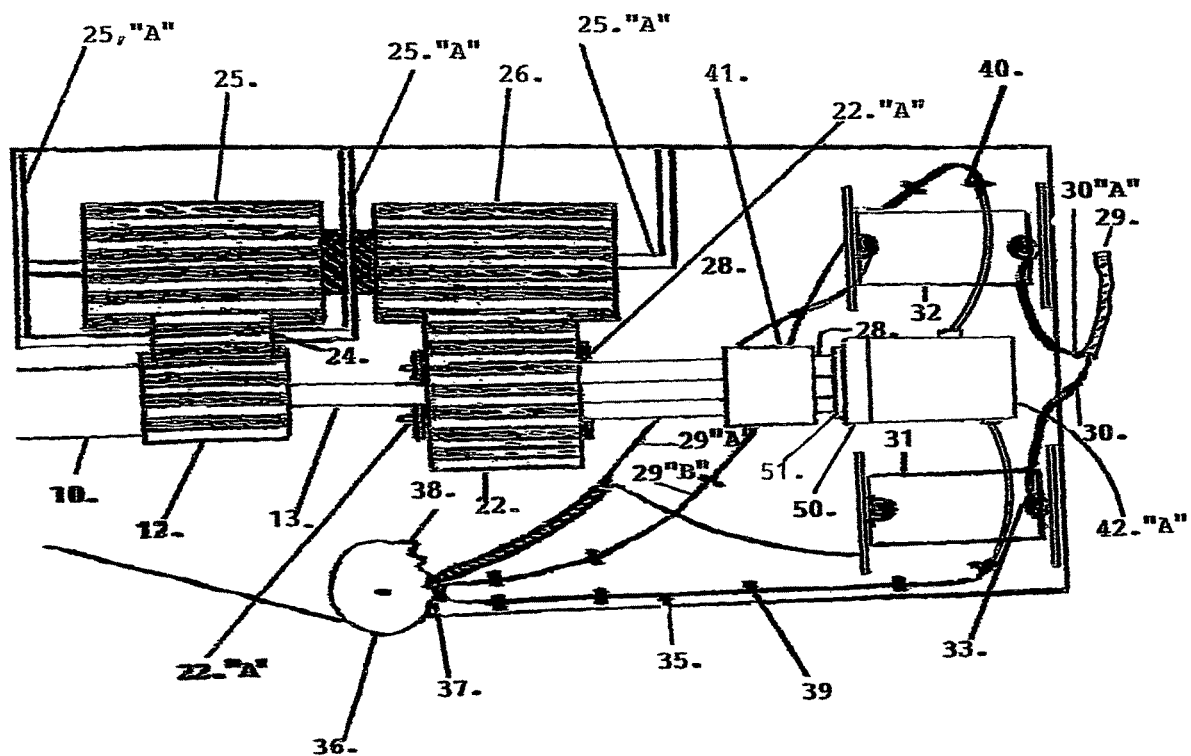
Figure (14.)

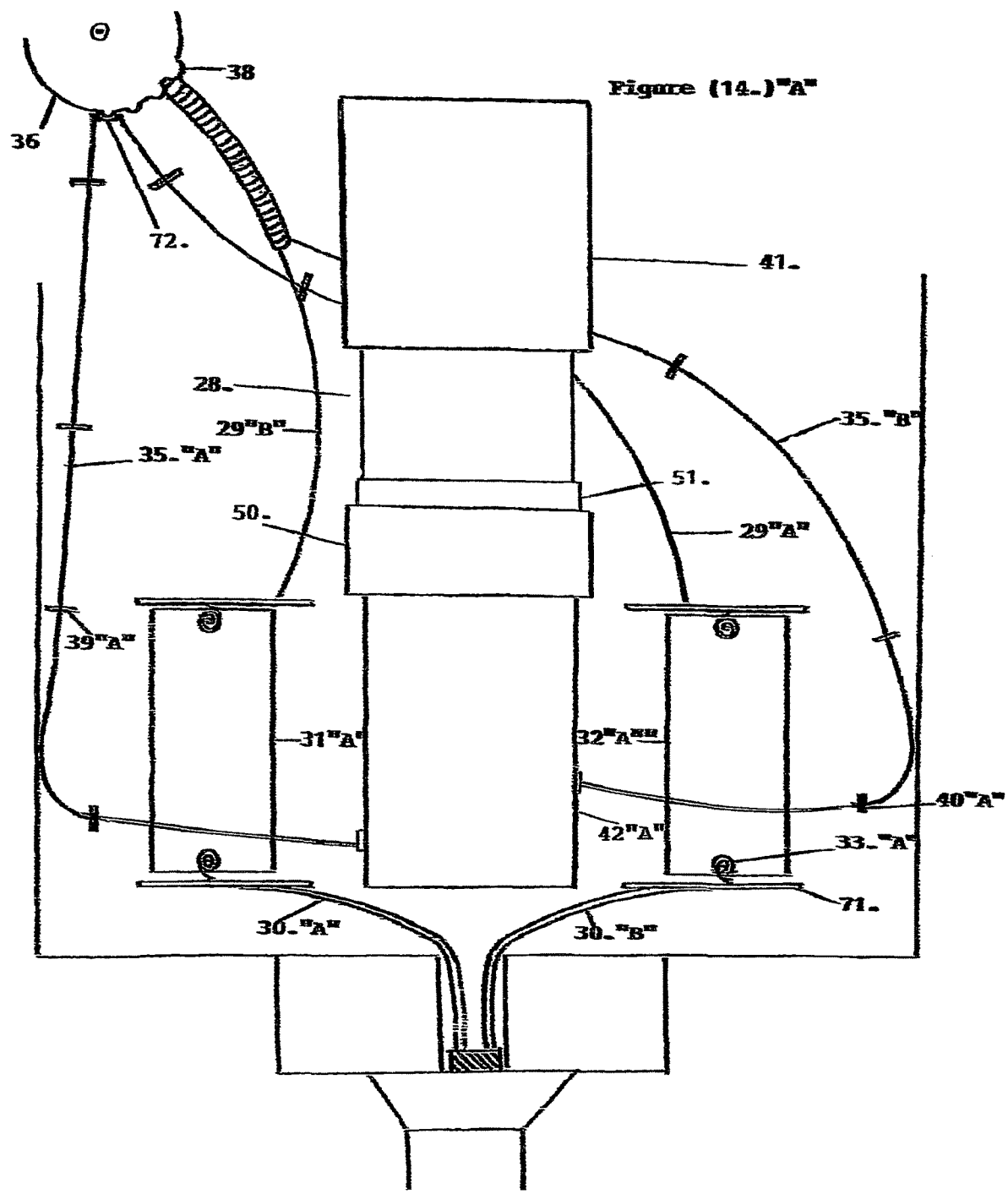

Figure (15.)
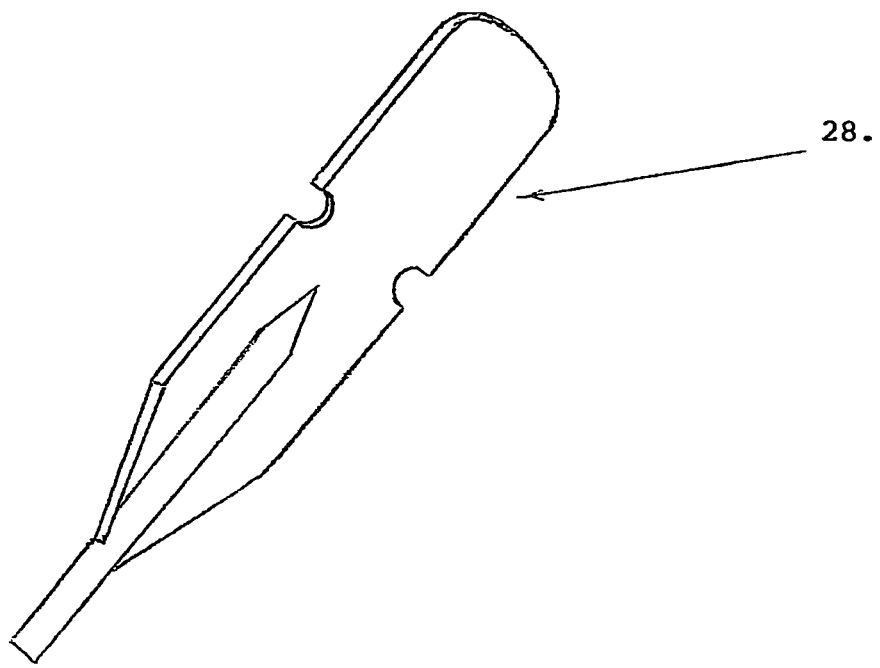
Figure (16.)
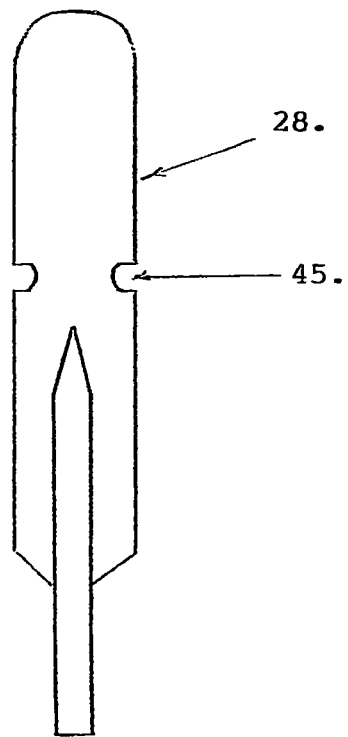
Figure (17.)
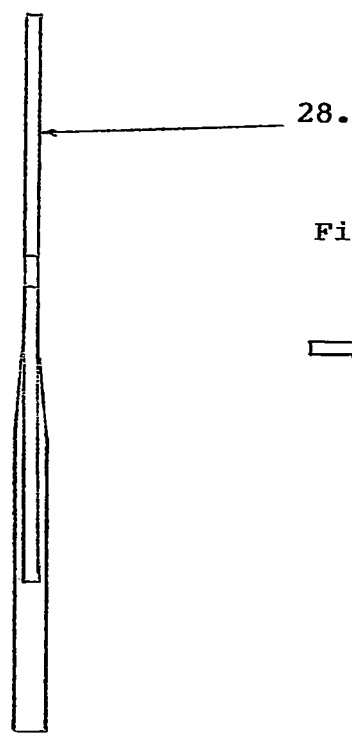
Figure (18.)
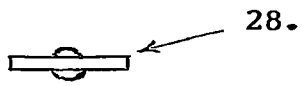

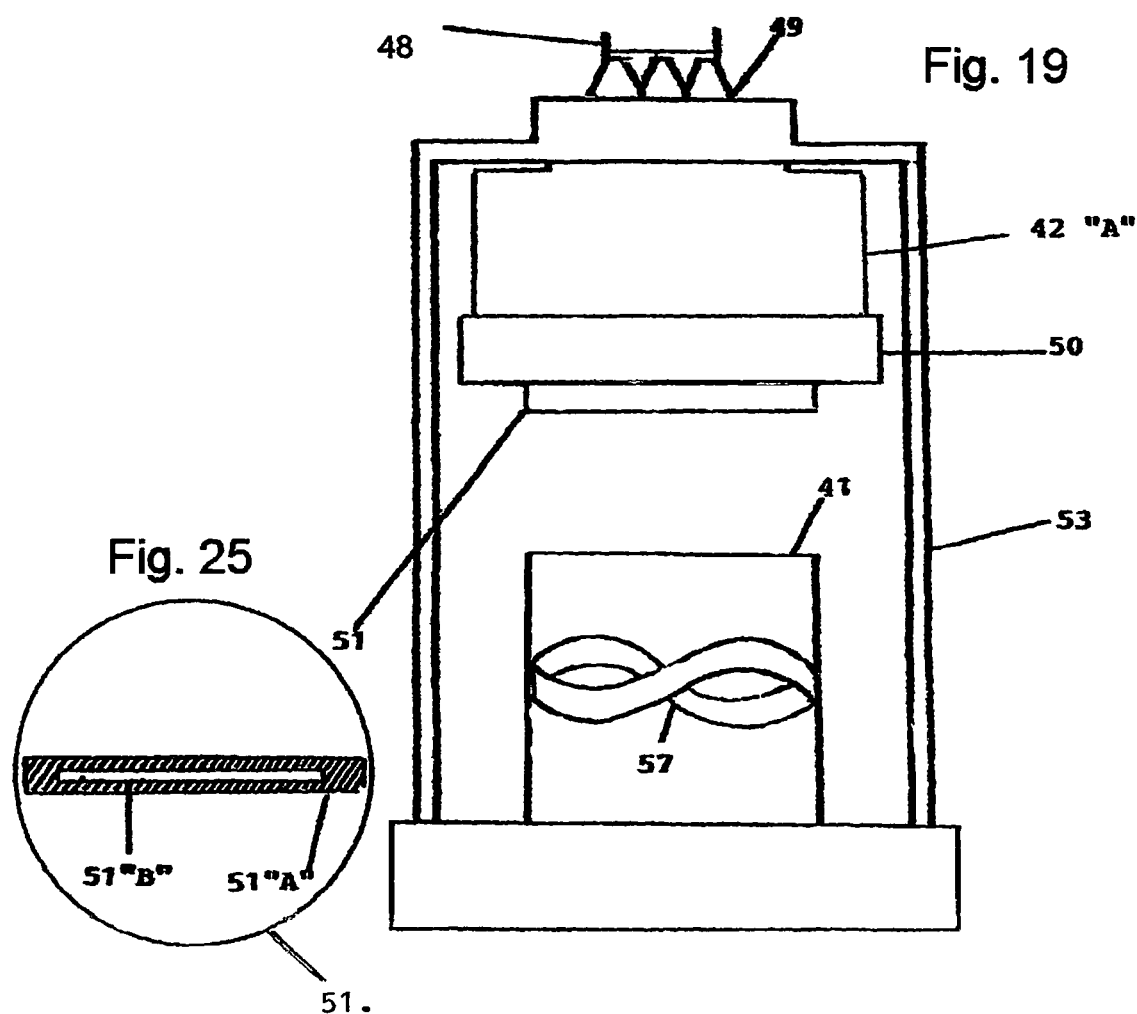

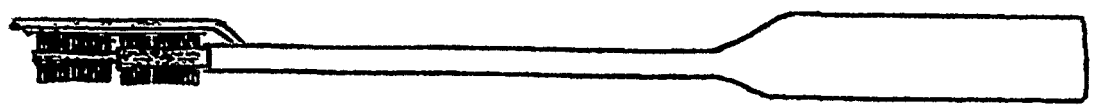
Fig. 20
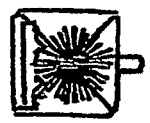
Fig. 21
Fig. 22
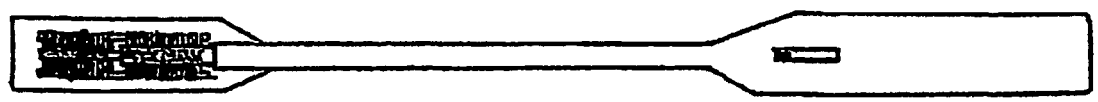
Fig. 23
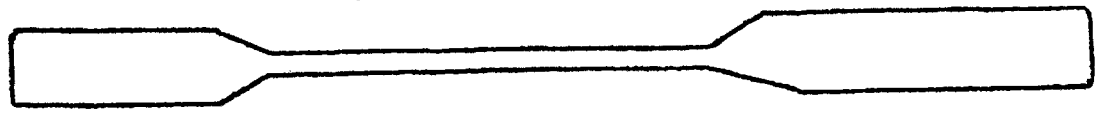

ALTERNATE ELIMINATOR TOOTH

I, Alphonso W. BrownJr. have invented a very powerful stream line mechanical tooth brush that is more effective, and comfortable to use with ease when handling in cleaning the teeth, as its operated by electricity or by battery power. The body is made of two half sections of sturdy plastic half shells before assembly and after will create an extended tube with a handle section that contains the gear system, motor, and three way switch as the extend tube has the one in one dual axel assembly as the cheek protector placed in its front end and when all is assembled creates the streamline body for easy handling and comfortable in the mouth area while cleaning.

BRIEF DESCRIPTION OF THE DRAWINGS

FIG. 1 is a side view of the front and back brushes of the alternate eliminator tooth brush.

FIG. 2 shows arrows depicting counterclockwise movement.

FIG. 3 shows arrows depicting clockwise movement.

FIG. 4 is a front view of the shape and design of the two tooth brush heads.

FIGS. 5-7 depict the cheek protector.

FIGS. 8-10 show mechanical units of the main drive stem and geared axel shafts.

FIG. 11 is a view of the top half of the two part shell body of the tooth brush.

FIG. 12 is a cross-section of the primary gear and paddle gear.

FIG. 13 shows the geared shaft and its single gear with the back tooth brush head on its front end just behind the front tooth brush head and the mechanism for allowing rotation and reciprocation.

FIGS. 14 and 14A shows an overall view of the bottom half of the shell with the installation of a three way switch placed just below the gear system featuring the motor connection.

FIG. 15-18 shows views of the paddle gear with two notches.

FIG. 19 shows a protruded figure eight gear that the two notches of the paddle gear will travel over and around.

FIGS. 20-23 shows the completed assembly of the tooth brush of FIG. 11 as a side view, a front view, a bottom view, and a top view.

FIG. 25 shows the slot of the electric motor where the back end of the paddle gear is seated.

DETAILED DESCRIPTION OF THE INVENTION

Figure 26:
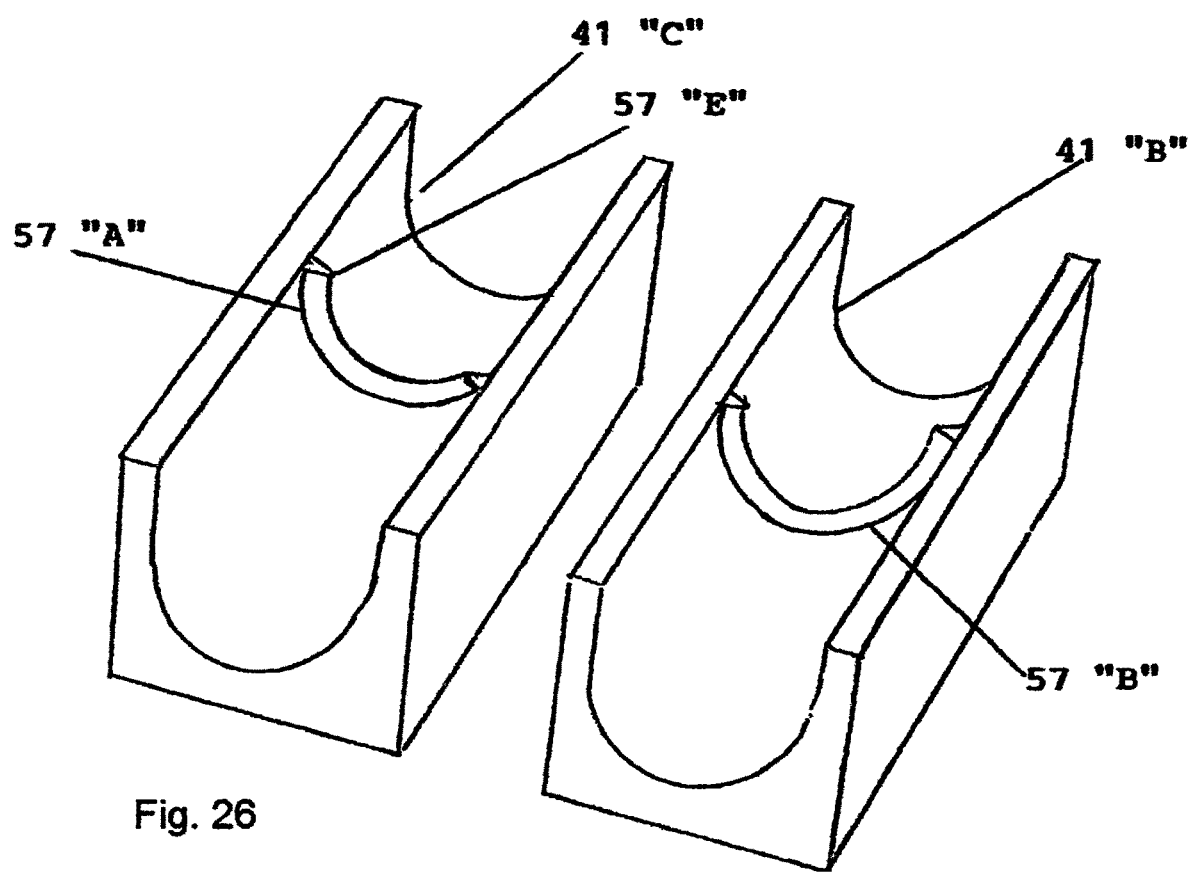
FIG. 26 shows two half sections of the single gear tooth box.

The mechanical units are shown in FIGS. 8-10 as the number one axel shaft is the main drive stem (13) shown in FIG. 9 with its round tooth brush head (2), with its paddle gear (28) and its notch (45), with the number two axel shaft being the geared shaft (10) with its attached to its backend (12) that is a steel gear epoxied on for strength, as the paddle gear is made as part of the main drive stem for strength, with the cheek protector shown on in FIGS. 5-7. The streamline occurs with the insertion of the main drive stem in the tooth brush head of the geared shaft with its paddle gear completely through extending out past the gear on its backend placing the front tooth brush just in front of the back tooth brush of the geared shaft shown in FIG. 10 round tooth brush heads (2,4), as the paddle gear is loosely keywayed in and through the primary gear (22). The paddle gear (28) as shown in Figure 14, passes through the single gear tooth box where the notched section engages the figure eight single gear tooth as the end of the paddle gear engages the coupling connector (51) where rotation is transferred turning the paddle gear as it freely turns in the tunnel of the single gear tooth box created when the cast two half sections (41B,41C) shown in FIG. 26 are put together with each half with a half section of a figure eight cast to the inner wall of the tunnel (57A,57B) creates a full single gear tooth of a figure eight as the box sits directly in front of the coupling connector (51) in FIG. 14.

In the motor where the rotation clockwise and the reciprocation of the paddle gear begins with the notches on the paddle gear (FIG. 9, 45) rotates over the protrude figure eight as the loose keyway of the paddle gear in the primary gear (22) turning clockwise engages the double sided gear (26) sending it in a counter clockwise direction a long with its other side (25) as it engages the transitional gear (24) returning the clockwise rotation as it engages the gear on the geared shaft sending it counter clockwise along with its front tooth brush head as the main stems tooth brush rotates opposite FIG. 3 arrows rotate clockwise, FIG. 2 counter clockwise FIG. 3 (2A) as the number two tooth brush head or back head rotates in a counter clockwise direction FIG. 2 (4A).

The second unique feature of the alternate eliminator tooth brush is what it does not do. And that is, it does not move back and forth or up and down, nor does it move in a limited circular motion. Because the heads move by rotating continuously from the inside to the outside. This action deposits film and food particles to the cleaner cleats. The third unique feature is that the number one head has the ability to reciprocate helping to remove film, and food particles away from the teeth and gums, but with the reciprocative action that helps to not only clean the teeth and gums but prevents build up of plaque by removing mucus that accumulates on, and between the teeth and gums that is removed by the rotation and reciprocation of the number one tooth brush head or the front tooth brush head that performs a dual operation, and along with the opposite rotation of the number two tooth brush head or the back tooth brush head there is a triple scouring of the teeth by the alternate eliminator tooth brush aided by the fourth feature of the tooth brush which is the cheek protector with cleaner cleats that continuously cleans the bristles of the round barrel shape tooth brush heads as they strike the cleaner cleats as shown on with FIG. 5. A bottom view, a side view and a front view of cleaner cleats (6) can be seen in FIGS. 5-7.

The alternate eliminator tooth brush is shown in four views. FIG. 8 as the hollow tube geared shaft, with its number two back tooth brush, a tooth brush head (4)and its single gear attached to its back end (12). FIG. 9 is the stainless steel main drive stem (15) as its number one front tooth brush head (13) as center of the shaft, and the paddle gear 28. FIG. 10 is the bottom half of the tooth brush shell showing its working parts (16). FIG. 11 is a view of the top half of the two part shell body of the tooth brush, which is shown completed in four views FIGS. 20-23 with FIG. 20 being a side view, FIG. 28 being a front view, FIG. 22 a bottom view, and FIG. 23 a top view.

The purpose of the alternate eliminator tooth brush is to ensure a better cleaning of the teeth and gums, with a triple action technique having a three way scouring action for brushing the teeth and gums. It all starts with two separate round barrel shaped tooth brush heads spaced approximately one eighth ⅛' of an inch prevents contact shown by 1 on FIG. 1. The⅛' inch apart rotating in opposite direction with the front tooth brush head reciprocating as this triple action increases the surface area as the bristles perform as a triple scrubbing tooth brush. This triple action is accomplished with a six gear system starting with the number one gear made as part of the stainless steel main drive stem as shown on FIG. 9 the paddle gear 28 formed at the back of the main drive stem with two notches cut on each side (45).

Figure 27:
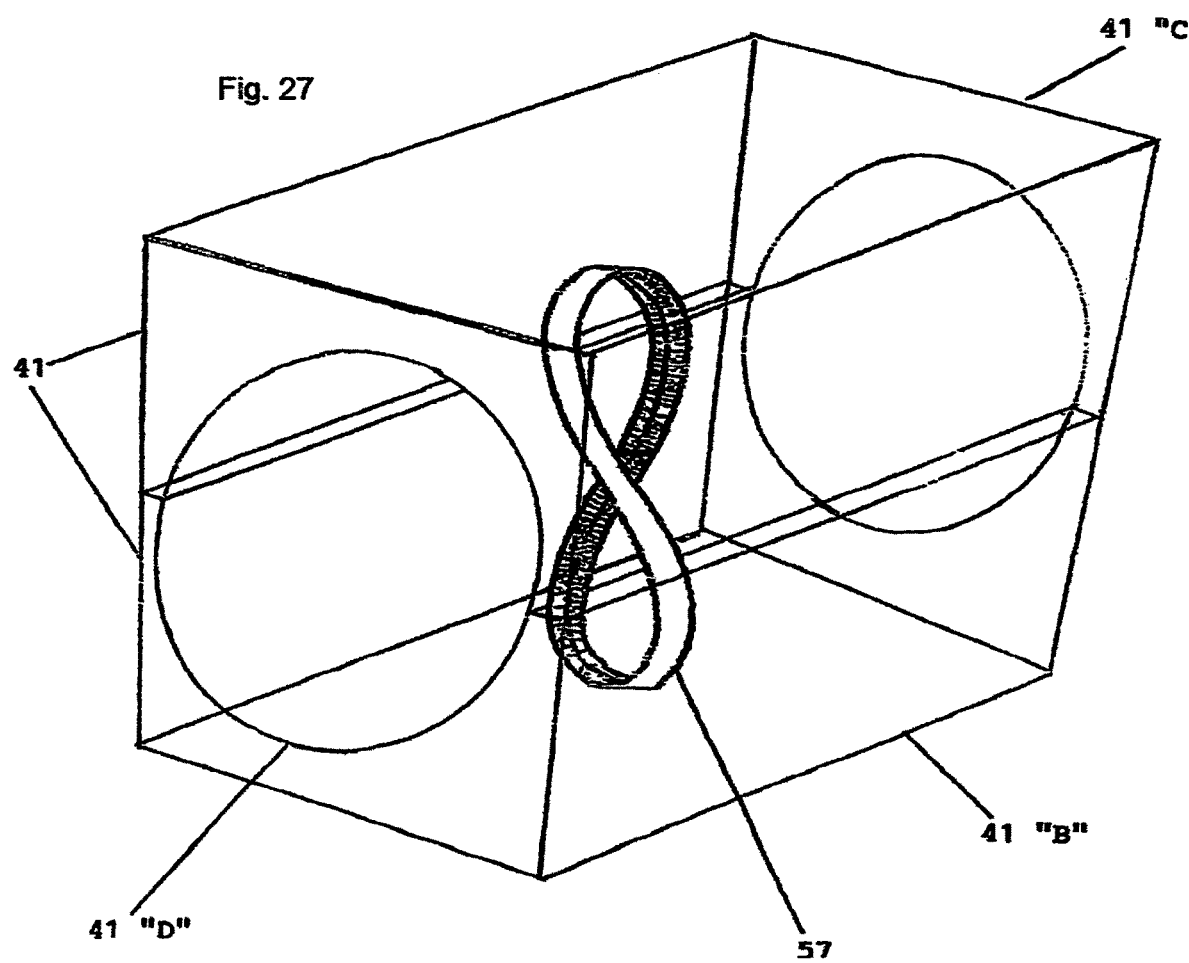
FIG. 27 showing two half sections assembled into the single gear tooth box.
Figure 29:
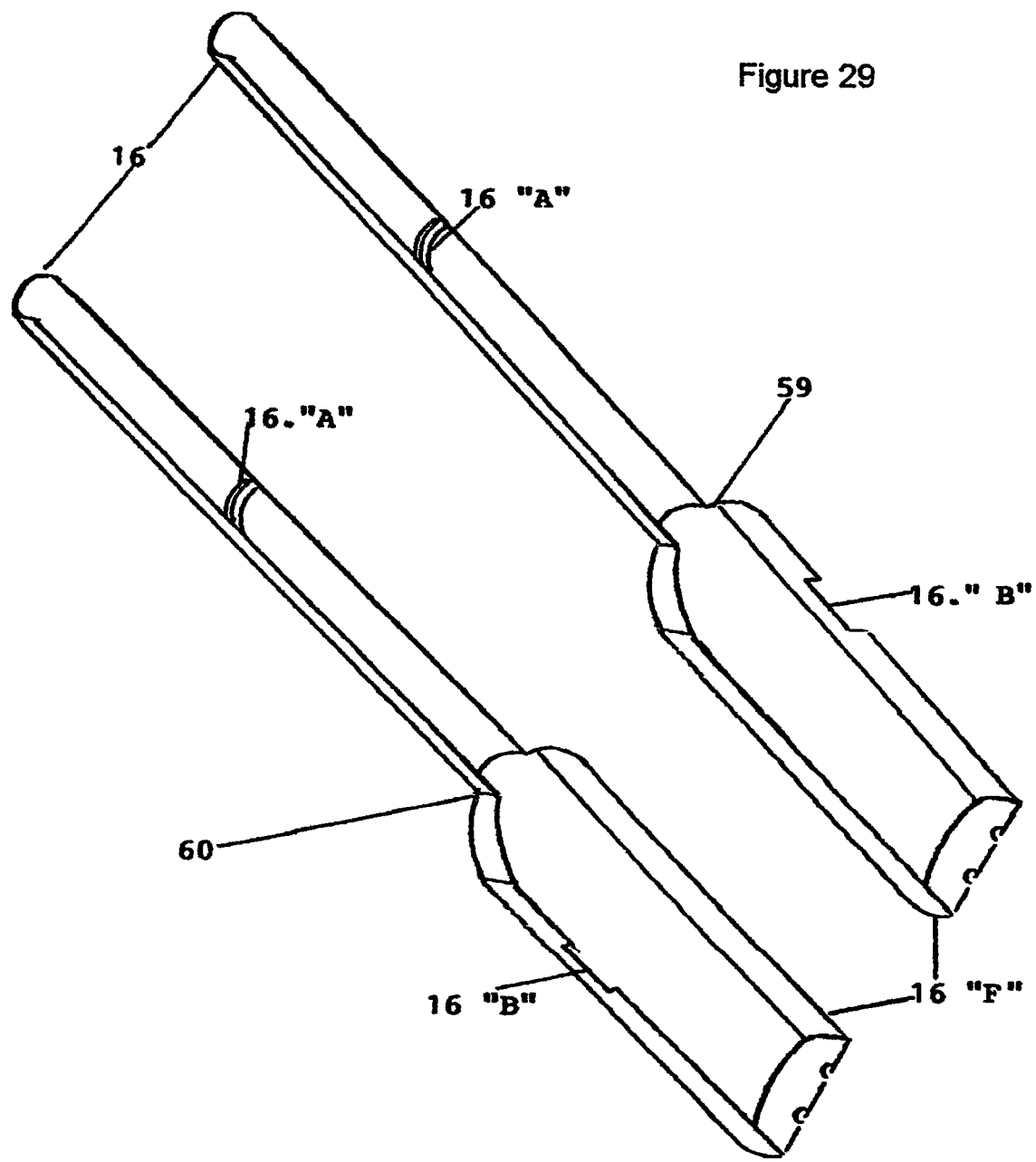
FIG. 29 represents the two half sections of the body of the alternate eliminator tooth brush halves and the opening for the off-on three way switch.

As these notches will travel over the protruded figure eight as the paddle gear is revolving causing the main drive stem to slightly move back and forth in a reciprocating movement along with its front tooth brush head. The full protruded figure eight gear shown on FIG. 27 inside as a see through view of the closed single gear tooth box 41 a long with the complete protruded figure eight inside (57), as the two half sections of the moulded or casted single gear tooth box with each half having a half section of the protruded off set figure eight is shown on FIG. 26, showing the bottom section (41B) and the top section (41C), 57A as the bottom half of the protruded off set figure eight and 57B as the top half, and together they form the offset figure eight single gear shown in FIG. 27 showing two half sections of the moulded or cast single gear tooth box made of brass or heavy duty aluminum, that is shown before assembly with a view of each with a half section of the moulded protruded figure eight moulded as part of each half of the box (57"A") as the half section of the figure eight, and the protruded edge (57"E") where the notches on the paddle gear will be fitted in order to revolve a round the completed figure eight to cause the main drive stem and its front tooth brush head to reciprocate. FIG. 41 represents an exploded view of the single gear tooth box as a see through figure in order to view the protruded figure eight (57) after the two half sections of the single gear tooth box is assembled with 41 representing the assembled single gear tooth box housing the protruded figure eight (57) and the tunnel (41"D"). FIG. 35 represents a cutaway partial section of the paddle gear (28) that shows the assembly or connection of the protruded figure eight with the protruded edge unseen only its back edge moulded as part of the inner wall of the single gear tooth box(57), and the two notches (45) with the hidden protruded edges on them to revolve causing the reciprocation of the main drive stem and its front tooth brush head. FIG. 29 represents the two half sections of the body of the alternate eliminator tooth brush top half 59, the bottom half 60, and the opening 16"B" for the off-on three way switch to be placed with the disk exposed in order to operate. Reference character 16 as one each half of the order to operate the switch, reference character 16 as the two half sections of the extended tube or barrel, the stationary stroud 16"A" for the keeper ring to be placed 16"F" as the two half sections of the handle section that will contain the motor and the working gears, as the completed tube or barrel 16 will contain the concentric formation of the main drive stem axel and the geared shaft axel with one inside the other.

The operation of the six gear system starts with the number one gear, the paddle gear and its back end being seated in the slot 51"B" of the electric motor shown on FIG. 25 where the clockwise rotation starts as the notches of the paddle gear 28 shown on FIGS. 16-18. The paddle gear, the notches (45) with its two notches that will travel over and around the number two gear, the protruded figure eight gear (57) shown on FIG. 19 that will cause the main drive stem and its front tooth brush to reciprocate as the front section of the paddle gear has been loosely keywayed in the primary gear(28) of FIG. 12 as it is in the hub of the primary gear the number three gear (22) shown on FIG. 14 as the loose keyway of the primary gear is to lessen and avoid any interference as the paddle gear reciprocates as it will turn the primary gear while the main drive stem with its paddle gear is reciprocating doing the engagement of the number four gear, the double sided gear with two like sides as shown on FIG. 14 reference characters 26 and 25, as 26 is the "A" side that is first engaged by the primary gear turning it in a counter clockwise rotation along with 25. The "B" side of the double sided gear that will engage the number five gear, the intermediate transitional gear that will transfer the counter clockwise rotation into a clockwise rotation as it engages the number six gear attached to the back end of the hollow shaft known as the geared shaft turning it into a counter clockwise rotation along with the number two or back tooth brush head attached to the front end of the geared shaft.

The assembly of the alternate eliminator tooth brush starts with two matching half shells made of strong durable plastic with each having half round shape in the form of a handle as each half will have a smaller half round shape of a tube or small barrel.

The tube or barrel is an extension of the half round shape of the handle, and when the two half are sealed together the handle will house the motor and gear assembly while the extended tube or barrel will house the two axels. Assembly of the working parts begin with a small electric motor seated and secured in the back of the bottom half of the shell in the handle section (19"F", 16) as shown on FIG. 11 as the extended tube or barrel, as you then reference character 19"A" as the housing for the electric motor that's shown by 42"A" on FIG. 14, the electric motor seated in the back of the handle. The single gear tooth box is seated and secured directly aligned with the motor shown by 41, FIG. 14. The single gear tooth box (42"A") the motor seated on mounts and secured with screws or epoxy keeping them tight and aligned with each other as they work in unison in the handle. Then the primary gear is keywayed in its hub with the paddle gear having the primary gear being installed directly in front of the single gear tooth box as shown in FIG. 14 as the primary gear (22) and as the single tooth gear box (41) as they are directly aligned as these three components carry the paddle gear after assembly, and having a true alignment will assure and maintain proper operations of the paddle gear (28). The assembly continues with the installation of the brackets for the double side gear and the intermediate transitional gear as one bracket with two mounts for both gears as shown on FIG. 14 at 25"A" with both gears being mounted as one on their mounts on the bracket, then the bracket and the two gears a reinstalled in the bottom half of the handle section together as the bracket is secured with screws or epoxied for stability a sit carries both the double sided and intermediate transitional gears, as the intermediate transitional gear will be positioned over the single gear attached to the back of the hollow tube called the geared shaft where it will engage the geared shaft for counter clockwise rotation.

The geared shaft will have a snug fitting three eighth of inch (⅜') plastic or stainless steel cylinder filled with bristles embedded around the cylinder to form a round tooth brush head as the cylinder is then epoxied to the front of the geared shaft creating the number two or the back tooth brush head, while a smaller cylinder also made of plastic or stainless steel approximately three eighth of an inch (⅜') will have bristles embedded a round the cylinder fastened with epoxy for stability for strength forming a round number one or front tooth brush head as it has two functions in rotation and reciprocation. Then the round tooth brush head is fitted and epoxied to the front end of the main drive stem, as the main drive stem is then inserted into the geared shaft with the front tooth brush head resting approximately one eighth of an inch in front of the back tooth brush head (2) as shown on FIG. 1 and the back tooth brush head (4), then the one eighth inch space between the two heads (1) preventing interference during opposite rotation and reciprocation. FIG. 4 is a front view of the shape and design (5) of the two tooth brush heads. The two axels of the alternate eliminator tooth brush are assembled with the motor and gear assembly starting with the paddle gears backend Inserted in a rotating slot in the motor shown on FIG. 25 as the slot housing (51"A") and the slot (51"B") where the end of the paddle gear is inserted in order to pickup clockwise rotation, as the notches of the paddle gear are then aligned and placed on the bottom half of the protruded figure eight moulded inside the bottom half of the single gear tooth box(41"B") on FIG. 26 as the bottom half of the single gear tooth box and 57"B" the bottom half of the protruded figure eight where the notches are placed, as the primary gear that has already been keywayed by the paddle gear is then placed between two keeper bumpers 22"A" on FIG. 13 as the keeper bumpers will prevent movement of the primary gear as it turns, because it is only held in place by the strength of the stainless steel main drive stems paddle gear, as its held against the "A" side of the double sided gear as shown at 22 on FIG. 14 as the primary gear engaged with the "A" side of the double sided gear 26 then 25 as the "B" side as it sits above the intermediate transitional while engaging it with its counter clockwise rotation in order to send the intermediate transitional gear into a counter clockwise rotation along with the single gear attached to the back of the geared shaft along with its front tooth brush known as the back tooth brush or the number two as the main drive stem inside is turning the front tooth brush head in a clockwise rotation. The assembly continues with the two axels placed together in the bottom half of the extended tube or barrel shown on FIG. 8 as the geared shaft (10) and as the ma in drive stem (FIG. 9, 13) with the outer axel the geared shaft having a keeper ring (10"A") formed or moulded a round its mid-section shown on FIG. 8.

The keeper ring 10A is placed between two stationary strouds in the extended tube or barrel shown on FIG. 10 at 16"A" that will maintain the position of the outer axel the geared shaft as the inner axel the main drive stem that is held in position with the notches cut on the paddle gear as they are on the protruded figure eight in the single gear tooth box shown on FIG. 27 at 41 as the see through diagram of the single gear tooth box 41"C" as the top half of the box and 41"B" as the bottom half of the single gear tooth box and 63 as the protruded figure eight with the two halves put together forming the protruded figure eight as it sets in the single gear tooth box. There are three views of the installation of the three way switch and the motor, along with the placement of the gear system. The first starts with FIG. 14 showing an over all view of the bottom half of the shell with the installation of the three way switch 36 placed just below the gear system featuring the motor connection (42"A") where the paddle gear is sea ted (28) after it is placed into the single gear tooth box (41) where the notches of the paddle gear rotate over the protruded offset figure eight causing the main drive stem of the paddle gear to reciprocate along with its front tooth brush head as the front section of the paddle gear is keywayed into the hub of the primary gear 22 as it turns in a clockwise direction turning the primary gear also in a clockwise direction as it engages the "A" side of the double sided gear 26 as the clockwise rotation of the primary gear is changed as the "A" side of the double sided gear is put into a counter clockwise rotation with this engagement that also turns the "B" side of the double sided gear in a counter clockwise rotation as it engages the intermediate transitional gear 24 as it picks up counter clockwise rotation that changes it to turn back into a clockwise rotation as the intermediate transitional gear engages the single gear 12 on the backend of the geared shaft 10 as the engagement of the intermediate transitional gears clockwise rotation turns the single gear and its shaft along with the number two tooth brush head attached to its front end in a counter clockwise rotation.

The electrical connections from the three switch to the motor is shown on FIG. 14 where the switch and working parts are seen in the handle section of the half shell as they are in installed, and there is a blow up of the opened motor 34"C" and 34"B" with the paddle gear inserted 28"A" after passing through the single gear tooth box 41"A", as the drawing shows the three way switch 36"A" with its wiring connections to the motor. The assembly continues with the top shell being assembled to the bottom half and epoxied to secure and seal the two halves, as the cheek protector with cleaner cleats 6 shown on FIG. 5 including the cheek protector 6"A" and the stem 6"B" that is inserted into the round front end of the extended tube or barrel epoxied for strength sealing it completing assembly of the alternate eliminator tooth brush.

Figure 24:
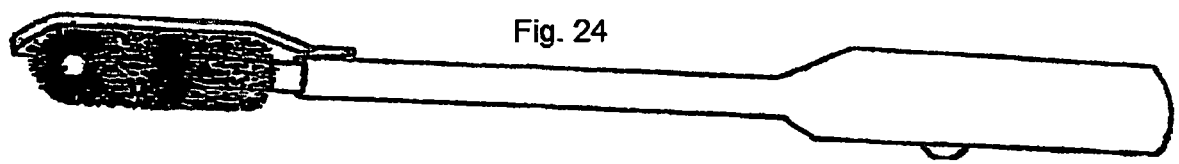
FIG. 24 is the three-D view of the alternate eliminator tooth brush.
Figure 28:
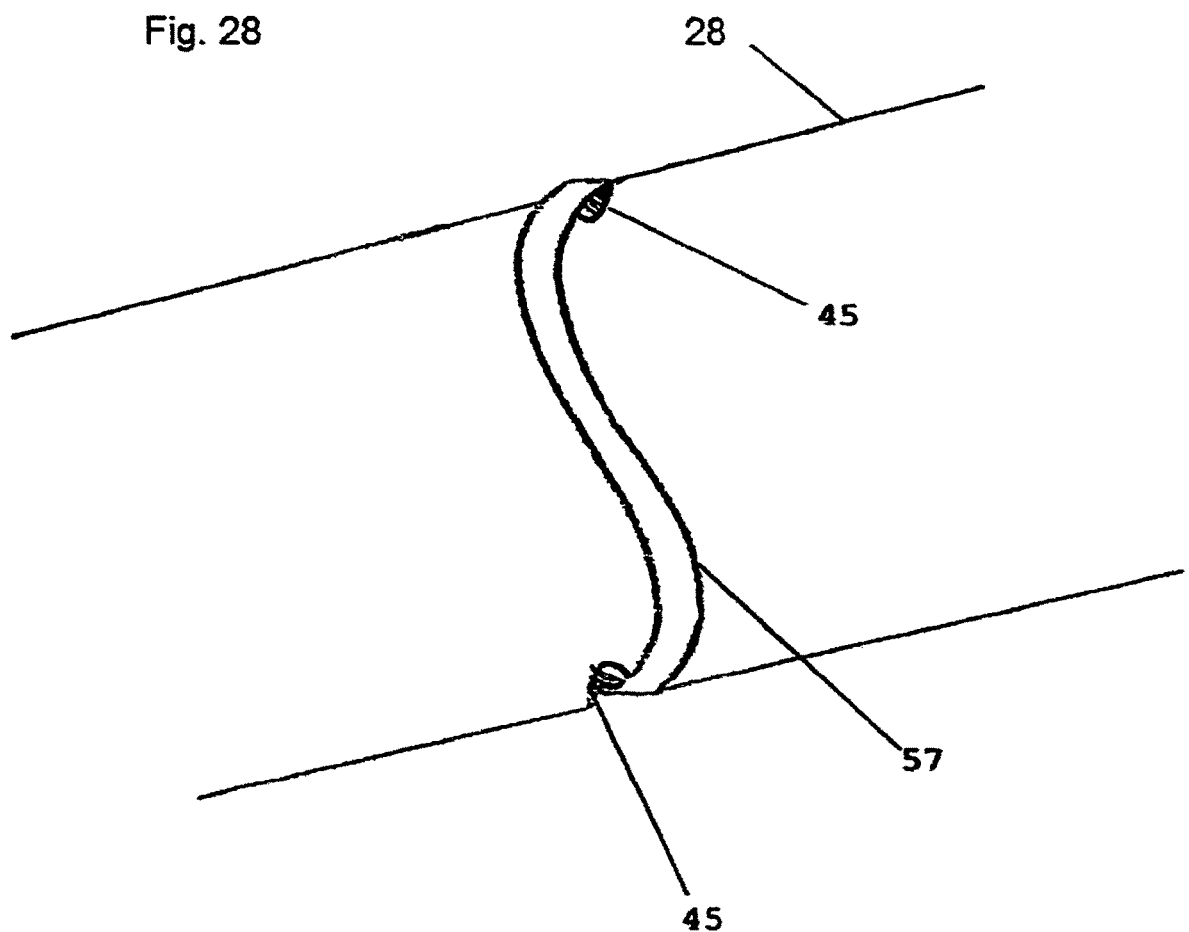
FIG. 28 is a cut away partial section of the paddle gear that shows the assembly of the protruded figure eight.

FIG. 28 shows how the notches form a coupling of the paddle gear and the offset figure eight shown as the paddle gear 28 then as the off set figure eight 57 showing one side, and as the two notches 45 as they are coupled and locked a round the protrusion of the figure eight as it rotates a round and over the figure eight causing the main drive stem 13 to reciprocate along with its front tooth brush head and the shaft of the ma in drive stem 13 together with its paddle gear is seated inside the motor where clockwise rotation is picked up and helps to distribute motion for operation for the alternate eliminator tooth brush. All starting with the three way switch being turned on as the paddle gear and its notched section placed on the protruded offset figure eight begin to rotate in a clockwise direction, the notches on the paddle gear travels over the figure eight putting the main drive stem and its front tooth brush head, not only in a clockwise rotation but also causing it to reciprocate, as the keywayed section of the paddle gear in the hub of the primary gear starts its rotation as it engages the double sided gear turning it as it engages the intermediate transitional gear that engages the single gear on the geared shaft turning it and its back tooth brush head in a counter clockwise rotation, this is the alternate eliminator tooth brush. The working parts are on FIG. 8, as the geared shaft, FIG. 9, as the main drive stem that is inserted into the geared shaft assembled on FIG. 10 into the bottom half of the tooth brush shell along with the gears and motor with FIG. 11 as the top half of the tooth brush shell and cheek protector 6"A", the four views of the assembled alternate eliminator tooth brush is shown on FIG. 20, as the side view, FIG. 21, as the front view, FIG. 22, as the bottom view and FIG. 23 as the top view. FIG. 24 is the three-D view of the alternate eliminator tooth brush, a tooth brush that will give a better scouring and cleaning of the teeth with a dual two head action with round full bristled heads with more bristles constantly rotating in opposite directions with the front tooth brush head adding a reciprocation motion as the three motions makes the alternate eliminator tooth brush far superior to any tooth brushes on the market today, as most only give a limited movement in brushing the teeth with a circular motion or short back and forth motions or short up and down strokes, and with each motion that does not travel very far on the surface of the teeth, while the alternate eliminator tooth brush will give a full covering of the teeth in a constant rotation going in opposite directions with one reciprocating at the same time with no wasted motion or movement covering more surface area of the teeth and gums with a vigorous scouring motion providing a brilliant thorough cleaning.

The double tooth brush heads with opposite rotations by the alternate eliminator tooth brush is accomplished with a single gear at the back end of the geared shaft, and a paddle gear made on the back end of the main drive stem driven by four gears that includes the paddle gear powered by an electric motor that drives the paddle gear that gives motion to all gear movement, as its notched sections rotate over the protruded edge of the offset figure eight, with the protruded edge 57. "E" shown on FIG. 26.

The dual action of the alternate eliminator tooth brush along with the reciprocation of the front tooth brush head is accomplished with a six gear system powered by an electric motor controlled by a three way switch, all achieved after the paddle gear has been keywayed into the hub of the primary gear and then inserted in the single gear tooth box where the two notches are placed onto the bottom half of the protruded figure eight and locked in after the top half of the single gear tooth box is positioned on the bottom half and the back edge of the paddle gear as shown on FIG. 14"A" as the paddle gear 28, the single gear tooth box 41, then view the paddle gear as its seated into the coupling connector 51"A" of the main drive shaft, unseen inside the motor 34"B" where rotation is started, controlled by the off-on switch 36 where the smallest nodule cuts off the current by opening the connection of the control coil 72 a s all the highest speeds are controlled by the a mount of current received by the size of each nodule on the off-on switch 38 as the largest nodule pulls more current causing more speed closing the control coil closer to the positive lead for more current. The positive and negative currents is an alternating current received from the motor to the off-on switch as the motor 42"A" sends current from its positive coil 31"A" controlled by the off-on switch to its control coil 72 as current is limited by the turn of the switch as it adjust the speed in order to govern the speed by each nodule controlling the dual tooth brush heads as they scour the teeth, as current is brought from the positive side to alternate back to the negative side. And in doing so, the electrical alternating current powers the motor that drives the rotating shaft that is unseen in the drawings as it sits in the motor shown on FIG. 14 with 42"A" as its rotating shaft is attached, to the coupling connector 51 where the paddle gear is seated, while not being firmly connected to allow for the ease of reciprocative movement of the main drive stem 13 along with its front tooth brush head 2 shown on FIG. 9 with the paddle gear 28 on the main drive stem along with its notches 45. These notches will travel over the protruded figure eight 57 shown on figure 27 that will cause the reciprocation, with the aid of the loosely keywayed paddle gear into the hub of the primary gear that turned by the paddle gear as the keyway is shown on FIG. 21 with the paddle gear in the hub of the primary gear 22 as the loose keyway of the paddle gear will help prevent interference as the paddle gear reciprocates as it turns the primary gear at the same time as it powers three others and the back tooth brush head of the geared shaft, shown on FIG. 14 as the primary gear 22 as it engages the double sided gear 26 turning it in a counter clockwise rotation from the clockwise rotation of the primary gear, and as the side 25 of the double sided gear is also rotating in a counterclockwise rotation as it engages the intermediate transitional gear 24 turning it in a clockwise rotation as it then engages the single gear on the back end of the geared shaft and its back tooth brush head attached to its front end putting them both in a counter clockwise rotation shown on FIG. 13. FIG. 13 shows the geared shaft 10 and its single gear 12 a s both turn in a counter clockwise rotation along with the number two or the back tooth brush head on its front end just behind the front tooth brush head or the number one tooth brush head attached to the main drive stem as they both turn in a clockwise rotation a opposite direction from the back tooth brush head, while the front tooth brush head is also reciprocating adding that triple scouring action for a better cleaning of the teeth and gums as this triple operation is the prime function of the alternate eliminator tooth brush, as it provides the very best in cleaning with dual rotating tooth brush heads turning in opposite directions as the front tooth brush head on the main drive stem is also reciprocating with the main drive stem, which is the primary axel providing power for the triple action starting with its paddle gear that is part of the main drive stem as its first keywayed into the primary gear that powers the geared shaft, then its seated in the motors slot housing FIG. 25, 51"A" as the end of the paddle gear is loosely seated into the slot 51"B", as the notches on the paddle gear are aligned and placed down on the protruded figure eight casted on the bottom half o fa moulded aluminum single gear tooth box FIG. 26 as the bottom half where half of the protruded figure eight: is casted 57"A" and 57"E" is its protruded edge, and as the top half of the single gear tooth box is placed on the bottom it will seal and lock the paddle gear allowing only limited back and forth movement for reciprocation as the top half of the single gear tooth box 41"C" and the bottom half 41"B" create a tunnel 42"D" wide enough to accommodate free rotation of the paddle gear as its notches move easily as they travel over the protruded figure eight without any interference as the motion is shown on FIG. 28. FIG. 28 shows the mid-section of the paddle gear 28 and the notches 45 of the paddle gear and the backside of the protruded figure eight 57, while FIG. 27 represents an exploded view of a see through complete single gear tooth with the top and bottom halves connected together 41 as a full view of the connected protruded figure eight is shown inside 57 and when the paddle gear is inserted and the three way switch is activated the paddle gear will turn along with its notches traveling over the figure eight causing the reciprocation of the main drive stem and its front tooth brush head turning clockwise, as the keywayed section of the paddle gear in the primary gear 22 in FIG. 14. as it engages the double sided gear at its "A" side 26 turning it in a counter clockwise rotation along with its "B" side that engages the transitional gear 24. setting it in a clockwise rotation as it engages the single gear 23 attached to the back end of the geared shaft putting it into a counter clockwise rotation along with its geared shaft and its back tooth brush head attached to its front end, as it works in unison with the front tooth brush head on the main drive stem as they rotate in opposite directions as the front tooth brush head reciprocates giving the triple action operation and function in cleaning the teeth and gums by the alternate eliminator tooth brush.

The invention claimed is:

1. A mechanical toothbrush comprising: a front brush head that includes bristles having a first length and a back brush head that includes bristles having a second length, where said first and second lengths being different, said front brush head and said back brush head being separate brush heads aligned in a collinear formation and rotating in opposite directions from each other, said front brush head also reciprocating simultaneously as it rotates, said front brush head being mounted on a stainless steel main drive stem axel, said back brush head being mounted on a geared shaft axel, said main drive stem axel and said geared shaft axel being concentric to each other, said main drive stem axel being inserted into and extending through said geared shaft axel, said front brush head rotating clockwise and reciprocating simultaneously from a loose keyway fitting in an opening of a hub of a primary gear, said primary gear transferring rotation to an "A" side of a double sided gear, which then transfers rotation to a "B" side of said double sided gear which then transfers rotation to a transitional gear located directly below which engages with a single gear attached to a back end of the geared shaft axel for providing counterclockwise rotation to said back brush head thereby executing three functions simultaneously, an off-on switch for providing power to the toothbrush and for selecting between three different speeds, wherein when the off-on switch is positioned in a first nodule power is provided to the toothbrush for activating the toothbrush, wherein when the off-on switch is positioned in a second nodule a low speed is provided, wherein when the off-on switch is positioned in a third nodule a medium speed is provided and wherein when the off-on switch is positioned in a fourth nodule a high speed is provided, said fourth nodule being connected to a round plastic disk mounted on a circuit board that is wired to an electric motor for providing current, said main drive stem axel being attached with a paddle gear that includes a notch on each side thereof, each of said notch being attached to a cast figure eight for providing rotation and reciprocation to said front brush head as said notch moves freely around said cast figure eight, said cast figure eight being formed in two half sections, each section being cast to an inside half round wall of a half section of a geared tooth box, such that when the two half sections are assembled a single gear tooth is provided as part of said inside wall with said figure eight protruding from said round wall allowing said paddle gear and each of said notch to rotate freely around said wall thereby allowing each of said notch to travel over the protruded figure eight without inhibition, said toothbrush further including two matching identical sturdy plastic half shells formed from a top half and a bottom half, said bottom half including a handle section, an extended tube or barrel section and a wired electric motor powered by a battery or electricity and is mounted on a connection post and secured as said geared tooth box is positioned on a mounting post directly in front of said motor, an opening where an open jaw coupling connector is located within said geared tooth box and is secured to said mounting post, said primary gear having an opening for accepting the main drive stem axel and the paddle gear, and said top half and said bottom half including edges provided with a bead of waterproof sealant thereby creating a waterproof body, and said front brush head and said back brush head being aligned directly in front of a cheek protector.

* * * * *